United States Patent
Mizobuchi et al.

(10) Patent No.: US 9,432,127 B2
(45) Date of Patent: Aug. 30, 2016

(54) LIGHT RECEIVING CIRCUIT, OPTICAL TRANSCEIVER, AND RECEIVED OUTPUT WAVEFORM CROSS POINT CONTROLLING METHOD

(71) Applicant: Hitachi Metals, Ltd., Tokyo (JP)

(72) Inventors: Kenji Mizobuchi, Hitachi (JP); Takayuki Ogami, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 43 days.

(21) Appl. No.: 14/608,008

(22) Filed: Jan. 28, 2015

(65) Prior Publication Data

US 2015/0381287 A1 Dec. 31, 2015

(30) Foreign Application Priority Data

Jun. 30, 2014 (JP) .................................. 2014-134197

(51) Int. Cl.
*H04B 10/69* (2013.01)
*H04B 10/079* (2013.01)

(52) U.S. Cl.
CPC .... *H04B 10/6933* (2013.01); *H04B 10/07955* (2013.01)

(58) Field of Classification Search
CPC ................................................ H04B 10/6933
See application file for complete search history.

(56) References Cited

U.S. PATENT DOCUMENTS

| 5,600,125 | A | * | 2/1997 | Poorman | ................ | G01D 3/036 |
| | | | | | | 250/205 |
| 5,953,690 | A | * | 9/1999 | Lemon | ................ | H03G 3/3089 |
| | | | | | | 250/214 C |
| 8,766,728 | B2 | | 7/2014 | Ito et al. | | |
| 2003/0098724 | A1 | * | 5/2003 | Nishizono | ............... | H03F 3/087 |
| | | | | | | 327/94 |
| 2011/0222867 | A1 | * | 9/2011 | Dietz | ...................... | H03F 3/087 |
| | | | | | | 398/203 |
| 2013/0135054 | A1 | | 5/2013 | Ito et al. | | |
| 2014/0193164 | A1 | * | 7/2014 | Ide | ..................... | H04B 10/6933 |
| | | | | | | 398/210 |
| 2014/0333285 | A1 | * | 11/2014 | Tanaka | ..................... | G01J 1/44 |
| | | | | | | 324/96 |
| 2015/0372648 | A1 | * | 12/2015 | Sugimoto | ............... | H03F 1/083 |
| | | | | | | 330/2 |

FOREIGN PATENT DOCUMENTS

JP 2013-115562 A 6/2013

\* cited by examiner

*Primary Examiner* — Nathan Curs
(74) *Attorney, Agent, or Firm* — McGinn IP Law Group, PLLC

(57) ABSTRACT

A light-receiving circuit includes an optical-to-electrical transduction element, a TIA processing section to output a voltage in proportion to a current input from the optical-to-electrical transduction element, and a control section to control the TIA processing section. The TIA processing section includes a TIA, which generates the voltage output signal in proportion to the current input from the optical-to-electrical transduction element, an amplifier, which amplifies the output signal of the TIA, a monitoring portion, which monitors the current to be input to the TIA, and an offset-adjusting portion provided between the TIA and the amplifier to adjust and output an offset level of the output signal of the TIA to the amplifier. The control section acquires a value of the current to be input from the monitoring portion to the TIA, and controls the offset-adjusting portion so as to adjust the offset level in proportion to that acquired current value.

5 Claims, 3 Drawing Sheets

LIGHT RECEIVING CIRCUIT, OPTICAL TRANSCEIVER, AND RECEIVED OUTPUT WAVEFORM CROSS POINT CONTROLLING METHOD

The present application is based on Japanese patent application No. 2014-134197 filed on June. 30, 2014, the entire contents of which are incorporated herein by reference.

BACKGROUND OF THE INVENTION

This invention relates to a light receiving circuit, an optical transceiver and a received output waveform cross point controlling method.

DESCRIPTION OF THE RELATED ART

As a light receiving circuit provided in an optical transceiver and the like, a light receiving circuit comprising a photoelectric conversion element such as a photodiode (PD) which transduces an input optical signal into an electrical signal, and a transimpedance amplifier processing section (hereinafter, referred to as "TIA processing section") which outputs a voltage in proportion to an electric current input from the photoelectric conversion element has been known.

In general, the term "transimpedance amplifier (hereinafter, referred to as "TIA")" refers either to only an electric current to voltage convertor, or to a whole of that electric current to voltage convertor and its peripheral circuit such as an amplifier, but, herein, only the electric current to voltage convertor is termed the "TIA", and the whole of that electric current to voltage convertor and its peripheral circuit such as an amplifier is termed the "TIA processing section".

Note that as prior art publication information associated with the invention of this application, there is the following.
Refer to JP-A-2013-115562, for example.

SUMMARY OF THE INVENTION

Now, in order for the TIA processing section used in the light receiving circuit to achieve a good receiving sensitivity, the TIA processing section is configured to have a high transimpedance, in other words, a large gain.

For that reason, the conventional light receiving circuit has the following drawback: When a light input much higher than its receiving sensitivity is input, its received output waveform is saturated and distorted, and therefore cross points of that received output waveform greatly deviate from 50 percent.

More specifically, when the high light input is input, the difference in offset between the differential signal pair is large, distortion occurs in differential signals output by the TIA, and the cross points of the received output waveform greatly deviate from 50 percent. Note that the cross points are values, which represent relative positions of crossings in an eye pattern of digital data, when the digital data "1" is set at 100 percent while the digital data "0" is set at 0 percent.

For example, FIG. 5A is a schematic diagram showing one example of eye patterns of differential signals output by the TIA when a cross point is 40 percent, and FIG. 5B is a schematic diagram showing another example of eye patterns of differential signals output by the TIA when a cross point is 50 percent.

If the cross points of the received output waveform greatly deviate from 50 percent, the receiving sensitivity will be deteriorated and the overload will be aggravated.

As the TIA processing section, a TIA processing section having so-called automatic gain control (AGC) function, which serves to, at the time of the high input, lower the gain of the TIA processing section, suppress the saturation of the received output waveform and improve overload has been known. However, the light input range for this AGC function to be performed is limited. When the light input range for this AGC function to be performed is small, or when the TIA processing section with no AGC function is used, it is difficult to regulate the cross points of the received output waveform within the desired range.

Also, some of serializer/deserializers (SerDes) mounted on devices such as Ethernet (trademark) switches and the like for optical transceivers to be inserted have a cross point correction function, but others thereof do not have such a function. Thus, even when the devices have no cross point correction function, the cross points of the received output waveform are desired to be controlled within the desired range by the light receiving circuit so that no malfunction occurs.

Accordingly, it is an object of the present invention to provide a light receiving circuit, an optical transceiver and a received output waveform cross point controlling method, which solve the foregoing drawback, and which, even when a high light input is input, is capable of regulating cross points of a received output waveform within a desired range.

(1) According to a first embodiment of the invention, a light receiving circuit comprises:

a photoelectric conversion element to transduce an input optical signal into an electrical signal;

a transimpedance amplifier processing section to output a voltage in proportion to an electric current input from the photoelectric conversion element; and a control section to control the transimpedance amplifier processing section, the transimpedance amplifier processing section comprising:

a transimpedance amplifier, which generates an output signal having the voltage in proportion to the electric current input from the photoelectric conversion element;

an amplifier, which amplifies the output signal of the transimpedance amplifier;

a monitoring portion, which monitors the electric current to be input to the transimpedance amplifier; and an offset adjusting portion, which is provided between the transimpedance amplifier and the amplifier to adjust and output an offset level of the output signal of the transimpedance amplifier to the amplifier, wherein the control section acquires a value of the electric current to be input from the monitoring portion to the transimpedance amplifier, and controls the offset adjusting portion so as to adjust the offset level in proportion to that acquired electric current value.

In the first embodiment, the following modifications and changes may be made.

(i) The control section prestores a relationship between the electric current value to be input to the transimpedance amplifier and the offset level at which cross points of the signal to be output from the transimpedance amplifier processing section lie within a predetermined range, and based on that relationship, controls the offset adjusting portion.

(ii) The monitoring portion is a received signal strength indicator, which is mounted in the transimpedance amplifier processing section.

(2) According to a second embodiment of the invention, an optical transceiver comprises the light receiving circuit, as specified in (1) above.

(3) According to a third embodiment of the invention, a method for controlling cross points of a received output waveform of a light receiving circuit comprising a photoelectric conversion element to transduce an input optical signal into an electrical signal, a transimpedance amplifier processing section to output a voltage in proportion to an electric current input from the photoelectric conversion element, and a control section to control the transimpedance amplifier processing section, the transimpedance amplifier processing section comprising a transimpedance amplifier, which generates an output signal having the voltage in proportion to the electric current input from the photoelectric conversion element, an amplifier, which amplifies the output signal of the transimpedance amplifier, a monitoring portion, which monitors the electric current to be input to the transimpedance amplifier, and an offset adjusting portion, which is provided between the transimpedance amplifier and the amplifier to adjust and output an offset level of the output signal of the transimpedance amplifier to the amplifier, the method comprises at the control section, acquiring a value of the electric current to be input from the monitoring portion to the transimpedance amplifier, and controlling the offset adjusting portion so as to adjust the offset level in proportion to that acquired electric current value.

EFFECTS OF THE INVENTION

The present invention is able to provide the light receiving circuit, the optical transceiver and the received output waveform cross point controlling method, which, even when a high light input is input, is capable of regulating the cross points of the received output waveform within the desired range.

BRIEF DESCRIPTION OF THE DRAWINGS

The preferred embodiments according to the invention will be explained below referring to the drawings, wherein.

DETAILED DESCRIPTION OF THE PREFERRED EMBODIMENT

Next, an embodiment according to the invention will be explained below, in conjunction with the accompanying drawings.

Figure 1:
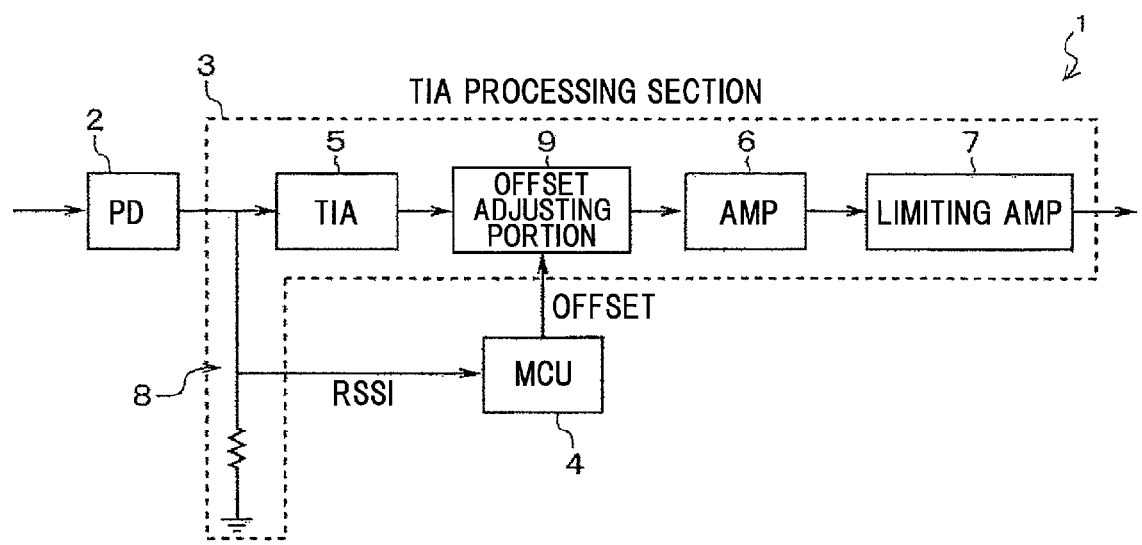
FIG. 1 is a schematic configuration diagram showing a light receiving circuit in one embodiment of the present invention.

FIG. 1 is a schematic configuration diagram showing a light receiving circuit 1 in the present embodiment.

As shown in FIG. 1, the light receiving circuit 1 comprises a photodiode (PD) 2, which acts as a photoelectric conversion element to transduce an input optical signal into an electrical signal, a transimpedance amplifier processing section (hereinafter, referred to as "TIA processing section") 3, which outputs a voltage in proportion to an electric current input from the PD 2, and a microcontroller (MCU) 4, which acts as a control section to control the TIA processing section 3.

The TIA processing section 3 comprises a transimpedance amplifier (hereinafter, referred to as "TIA") 5, which acts as an electric current to voltage convertor to generate the output signal having the voltage in proportion to the electric current input from the PD 2, an amplifier (AMP) 6, which amplifies the output signal of the TIA 5, and a limiting amplifier 7, which is provided at a post-stage of the amplifier 6. Note that herein the TIA processing section 3 is shown as including the limiting amplifier 7, but instead the TIA processing section 3 may not include the limiting amplifier 7, and the limiting amplifier 7 may separately be provided at a post-stage of the TIA processing section 3.

In this embodiment, as the configuration of the TIA processing section 3, there are further used a monitoring portion 8 to monitor the electric current to be input to the TIA 5, and an offset adjusting portion 9, which is provided between the TIA 5 and the amplifier 6 to adjust and output an offset level (i.e. DC offset level) of the output signal of the TIA 5 to the amplifier 6.

The monitoring portion 8 may use a received signal strength indicator (RSSI), which is mounted in the TIA processing section 3.

Although simplified in FIG. 1, the TIA 5 outputs differential signals, and the amplifier 6 and the limiting amplifier 7 use differential amplifiers, respectively. The offset adjusting portion 9 is configured to adjust the offset level of the differential signals so that the difference in offset level between the differential signals is zero, and, is configured so that the offset level of the differential signals is adjustable arbitrarily by an external control (herein a control by the MCU 4).

Now, in the light receiving circuit 1 in the present embodiment, the MCU 4 to act as the control section acquires an electric current value to be input from the monitoring portion 8 to the TIA 5, and controls the offset adjusting portion 9 so as to adjust the offset level in proportion to that acquired electric current value. The MCU 4 outputs a control signal (e.g., I2C (or "I²C": Inter-Integrated Circuit) control signal) to the offset adjusting portion 9, writes the offset level in a register of a microcontroller (not shown) in the TIA processing section 3 and thereby adjusts the offset level.

The MCU 4 is configured to prestore a relationship between the electric current value to be input to the TIA 5 (i.e. the current value to be monitored by the monitoring portion 8, herein referred to as RSSI level) and the offset level at which cross points of a signal to be output from the TIA processing section 3 lie within a predetermined range, and based on that relationship, control the offset adjusting portion 9.

Figure 2:
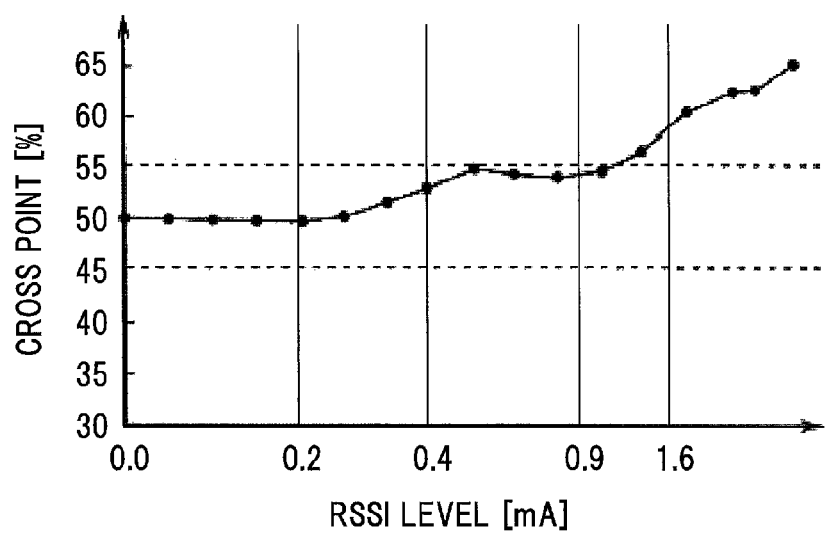
FIG. 2 is a graph chart showing one example of a relationship between RSSI level and cross points measured in the present invention.

Specifically, first, the light input to the PD 2 is varied and variations in cross points versus RSSI level are measured. Here, one example of the measured relationship between RSSI level and cross points is shown in FIG. 2. As shown in FIG. 2, when the RSSI level is low (the light input is low), the cross points are around 50 percent, but when the RSSI level is high (the light input is high), the cross points deviate from 50 percent. Note that herein the cross points are described as being controlled so as to lie within a range of not less than 45 percent and not more than 55 percent (i.e. within the range between broken lines in FIG. 2), and that it is seen that when the RSSI level is high (the light input is high), the cross points deviate from that range.

Next, based on the relationship of FIG. 2, for each RSSI level, the offset level at which the cross points are 50 percent is computed. One example of a relationship between the RSSI level and the offset level at which the cross points are 50 percent is indicated by broken line in FIG. 3.

Figure 3:
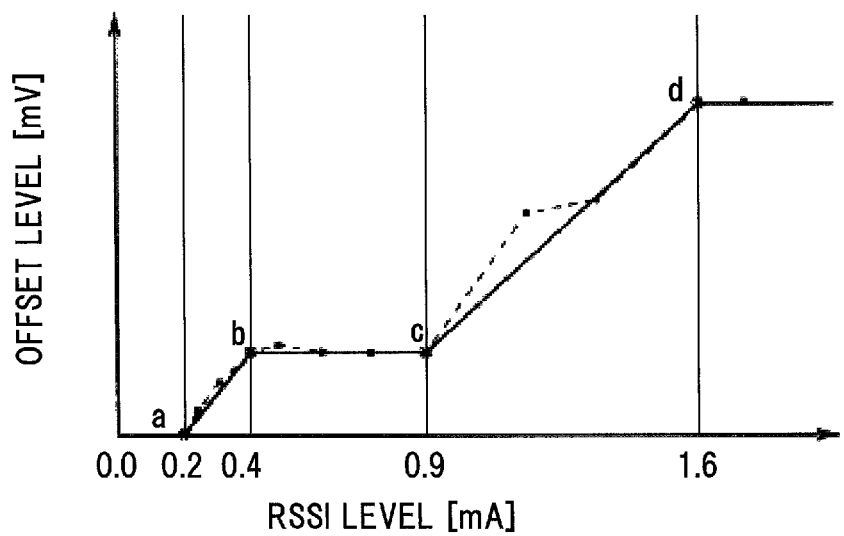
FIG. 3 is a graph chart showing one example of a relationship between RSSI level and offset level at which the cross points are 50 percent in the present invention.

The relationship indicated by broken line in FIG. 3 may be stored directly in the MCU 4, but in that case, its data capacity to be stored is large. Therefore, in the present embodiment, only four points indicated by a, b, c, and d in the relationship of FIG. 3 are stored in the MCU 4, and the relationship is linearly interpolated between the four points a, b, c, and d. Note that at RSSI levels below the point a, the offset level is 0 (i.e., no offset is adjusted), and that at RSSI levels above the point d, the offset level is a constant value equal to the offset level at that d point. That is, the MCU 4 adjusts the offset level by controlling the offset adjusting portion 9 so that the offset level satisfies the relationship indicated by solid line in FIG. 3. Note that the data format to be stored and the method for interpolation between the data are not limited thereto.

Figure 4:
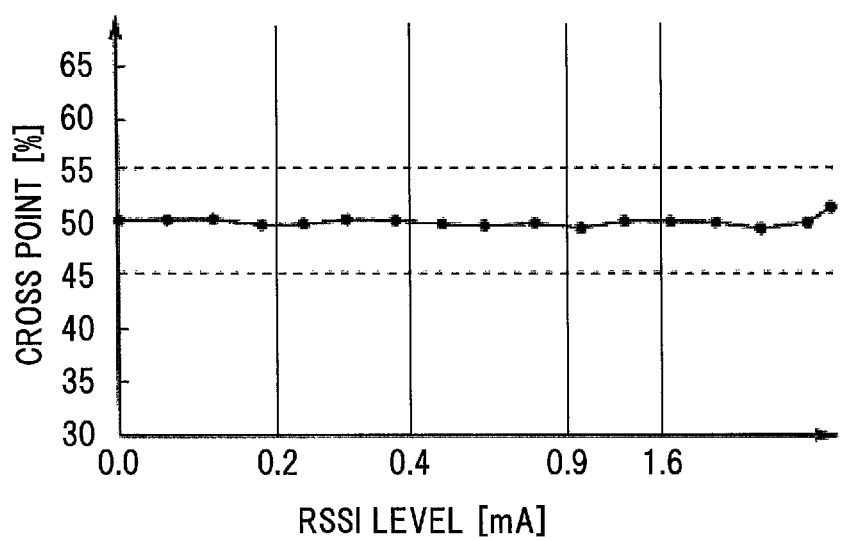
FIG. 4 is a graph chart showing one example of a relationship between RSSI level and cross points after offset adjustment in the present invention.
Figure 5A:
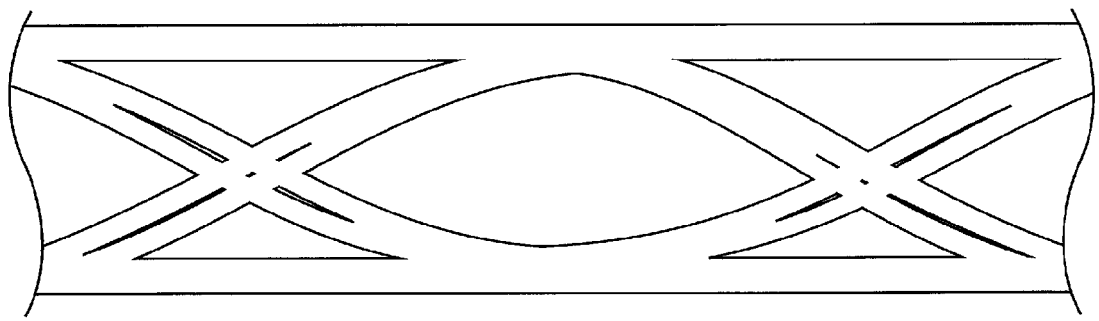
FIG. 5A is a schematic diagram showing one example of eye patterns of differential signals output by the TIA when a cross point is 40 percent.
Figure 5B:
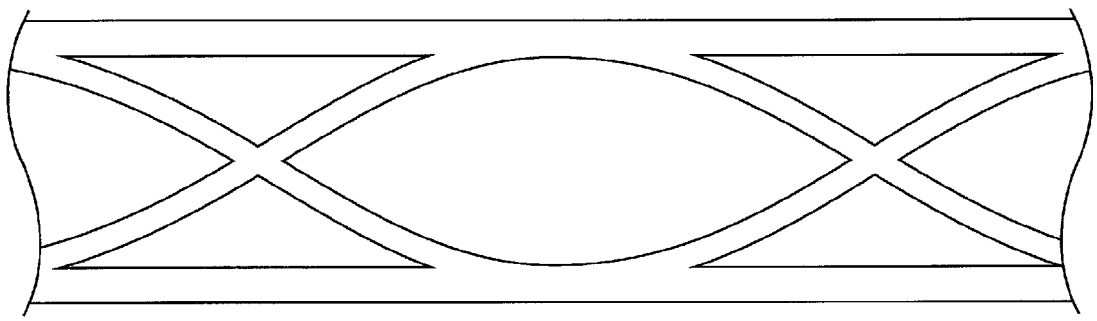
FIG. 5B is a schematic diagram showing another example of eye patterns of differential signals output by the TIA when a cross point is 50 percent.

When the relationship of FIG. 2 without offset level adjustment is given, the offset level is adjusted using the relationship of FIG. 3, and its measured cross point versus RSSI level result is shown in FIG. 4. As shown in FIG. 4, it is seen that the cross points lie within the desired range of not less than 45 percent and not more than 55 percent, regardless of the RSSI level.

Also, the data to be stored in the MCU 4, i.e. the corrected offset level value versus RSSI level relationship may be computed and stored in the MCU 4 for each of the light receiving circuits 1, or when the variation in the properties of the TIA processing section 3 is small, the corrected offset level value versus RSSI level relationship common to a plurality of the light receiving circuits 1 may be stored in the MCU 4.

An optical transceiver in the present embodiment is composed of the light receiving circuit 1 in the present embodiment, and a light transmitting circuit.

As described above, the light receiving circuit 1 in the present embodiment is configured to acquire the electric current value to be input from the monitoring portion 8 to the TIA 5, and control the offset adjusting portion 9 so as to adjust the offset level in proportion to that acquired electric current value.

This allows for, even when the high light input is input, suppressing the saturation of the received output waveform, and maintaining the cross points of the received output waveform within the desired range. Thus, it is possible to suppress the malfunction due to the deviations of the cross points, even when the TIA processing section 3 has no automatic gain control (AGC) function, or when serializer/deserializers (SerDes) of devices to be connected have no cross point correction function.

The invention is not limited to the above described embodiment, but various alterations may naturally be made without departing from the spirit and scope of the invention.

For example, although in the present embodiment, the electric current value to be input from the monitoring portion 8 to the TIA 5 is acquired and the offset level is adjusted in proportion to that acquired electric current value, it is also possible to restate the foregoing expression in different terms: the electric current value to be input from the monitoring portion 8 to the TIA 5 is proportional to the light input to the PD 2 and the offset level is adjusted in proportion to that light input.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A light receiving circuit, comprising:
    a photoelectric conversion element to transduce an input optical signal into an electrical signal;
    a transimpedance amplifier processing section to output a voltage in proportion to an electric current input from the photoelectric conversion element; and
    a control section to control the transimpedance amplifier processing section,
    the transimpedance amplifier processing section comprising:
    a transimpedance amplifier, which generates an output signal having the voltage in proportion to the electric current input from the photoelectric conversion element;
    an amplifier, which amplifies the output signal of the transimpedance amplifier;
    a monitoring portion, which monitors the electric current to be input to the transimpedance amplifier; and
    an offset adjusting portion, which is provided between the transimpedance amplifier and the amplifier to adjust and output an offset level of the output signal of the transimpedance amplifier to the amplifier,
    wherein the control section acquires a value of the electric current to be input from the monitoring portion to the transimpedance amplifier, and controls the offset adjusting portion so as to adjust the offset level in proportion to that acquired electric current value.
2. The light receiving circuit according to claim 1, wherein the control section prestores a relationship between the electric current value to be input to the transimpedance amplifier and the offset level at which cross points of the signal to be output from the transimpedance amplifier processing section lie within a predetermined range, and based on that relationship, controls the offset adjusting portion.
3. The light receiving circuit according to claim 1, wherein the monitoring portion is a received signal strength indicator, which is mounted in the transimpedance amplifier processing section.
4. An optical transceiver, comprising the light receiving circuit according to claim 1.
5. A method for controlling cross points of a received output waveform of a light receiving circuit comprising a photoelectric conversion element to transduce an input optical signal into an electrical signal, a transimpedance amplifier processing section to output a voltage in proportion to an electric current input from the photoelectric conversion element, and a control section to control the transimpedance amplifier processing section, the transimpedance amplifier processing section comprising a transimpedance amplifier, which generates an output signal having the voltage in proportion to the electric current input from the photoelectric conversion element, an amplifier, which amplifies the output signal of the transimpedance amplifier, a monitoring portion, which monitors the electric current to be input to the transimpedance amplifier, and an offset adjusting portion, which is provided between the transimpedance amplifier and the amplifier to adjust and output an offset level of the output signal of the transimpedance amplifier to the amplifier,
  the method comprising:
    at the control section, acquiring a value of the electric current to be input from the monitoring portion to the transimpedance amplifier, and controlling the offset adjusting portion so as to adjust the offset level in proportion to that acquired electric current value.

* * * * *